Feb. 10, 1925.
C. P. CIRAC
1,525,719
REVERSE MOVEMENT CONTROL FOR DRIVING AND DRIVEN ELEMENTS
Filed July 19, 1921
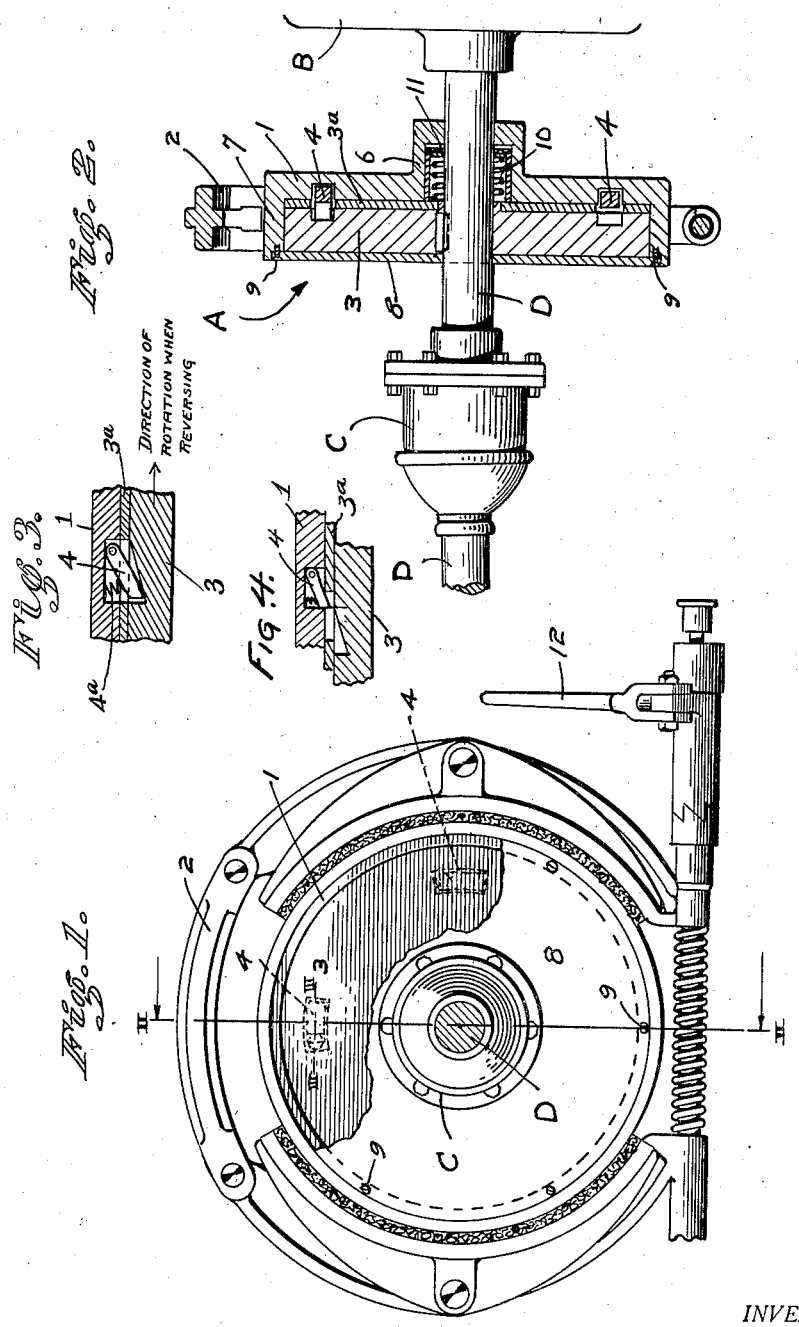
INVENTOR.
C. P. CIRAC
BY
ATTORNEYS.

Patented Feb. 10, 1925.

1,525,719

UNITED STATES PATENT OFFICE.

CHARLES PAUL CIRAC, OF FALLON, NEVADA.

REVERSE-MOVEMENT CONTROL FOR DRIVING AND DRIVEN ELEMENTS.

Application filed July 19, 1921. Serial No. 485,808.

*To all whom it may concern:*

Be it known that I, CHARLES PAUL CIRAC, a citizen of the United States, and resident of Fallon, county of Churchill, and State of Nevada, have invented a new and useful Reverse-Movement Control for Driving and Driven Elements, of which the following is a specification.

My invention relates in general to reverse movement control mechanisms for driving and driven elements, and has reference more particularly to means for automatically preventing or rather controlling the reverse movement of driving or driven elements, such as a power shaft or the like, so as to lock or at least brake the driving or driven elements as the case may be.

The salient features of my invention may find expression in various types of machine elements and while its use for the purpose of illustration is here shown and will be hereinafter referred to as incorporated in the drive shaft of a motor vehicle, this adaptation is only one of its many uses.

In the accompanying drawing I have shown a preferred construction of the mechanism, in which Figure 1 is a view in end elevation and partly in section of my improved device, and Figure 2 is a vertical axial section taken on the line 2—2 of Figure 1 and showing my invention as applied to the drive of a motor vehicle. Figure 3 is a fragmentary enlarged section of Figure 1 taken along the line 3—3 of same, and shows one of the locking dogs engaged. Figure 4 is a similar view with dog disengaged.

Referring now to the drawing in detail, "A" represents my improved reverse movement control which when used in connection with motor and the like vehicles I prefer to incorporate in the drive therefor, and in which "B" represents the outline of a customary gear set, "C" a universal joint, and "D" the drive shaft which extends from the gear set "B" to the universal joint "C" and thence rearwardly to the differential of the rear axle.

The three all important features of my invention consist in a drum (1), which is loosely mounted upon the drive shaft "D" with the brake band (2) around its circumference and with the driving disc (3) housed within the drum and keyed to the shaft "D" co-axially of the drum (1) and made to revolve with the drive shaft "D" in either a clockwise or anti-clockwise direction, and with the movement of the same in a reverse or anti-clockwise direction controlled by the brake band (2) through a locking connection between the disc (3) and the drum (1) so that the operator or chauffeur of a vehicle equipped with my invention may set the brake band (2) so that the reverse rotation of the ground wheels of the vehicle may be automatically controlled or prevented to defeat a backward movement of the vehicle on a grade, or even on a level.

The particular locking means between the disc (3) and the drum (1) comprises a plurality of dogs (4) housed within pockets in the drum (1) and urged into locking engagement with the disc (3) through openings in the control plate (3ª) by springs or the like (4ª), with the dogs and their engagement with the disc so arranged as to permit the free rotation of the disc (3) with the shaft "D" in one direction, but automatically locking the disc (3) to the drum (1) upon rotation of the shaft "D" in a reverse direction. The control plate (3ª) is made with openings corresponding to the number of dogs so that when the openings in the plate are aligned with the dogs the springs will urge the dogs through the openings in the plate and into the disc (3). The control plate is movable relatively to the drum but its movement there-against is limited, so that when the disc (3) is rotating in one direction said disc will ride over the dogs but when rotating in a reverse direction the locking engagement will be realized. Figure 3 shows the control plate (3ª) in position permitting the locking by the dogs as described, and Figure 4 shows its position with the disc (3) released.

The limited movement of the control plate is effected by the friction of its bearing against the disc (3) engendered by the reactance of the spring (10) against its inner edge; therefore, when the disc (3) revolves to the right or left it carries the control plate with it the amount of the limited distance.

The drum (1) includes the disc (3), which, as best shown in Figure 2, is housed within the annular opening in the drum with the braking circumference (7) of the drum enclosing the disc and with a plate (8) bolted or otherwise fixed as at (9) to the annular front edge of the drum to totally enclose the disc (3) and prevent oil contained within the drum from leaking past the disc. Suitable packing or other means may be incorporated in the plate construction to provide a practical leak tight connection.

The hub (6) of the drum is made to house the coil spring (10) which is adapted to maintain a metal and a felted washer (11) adjacent the end of the hub so that oil will be prevented from leaking from around this side of the drum and with the other end of the spring bearing against the inner edge of the control plate (3ª) to force it into frictional engagement with the disc (3) for the purpose explained.

The brake band (2) may be of any conventional construction so long as it has a braking contact with the outer circumference of the drum (1), and with the same controlled in the customary manner by a lever and link arrangement such as (12) which may extend within convenient reach of the driver's seat.

Operation.

It often happens on grades that the engine of the motor vehicle may fail to function which leaves it practically necessary to rely on either the transmission brake or the wheel brake to prevent the vehicle from backing down the grade. Should these brakes fail to function there is nothing to hold the vehicle. Then again, it is not always convenient to hold the vehicle on a grade with the usual braking arrangement should it become desirable or necessary to come to a standstill with the engine either running or cut off. If the grade is steep it requires considerable maneuvering to start the vehicle as the brakes must be released at practically the same time that the clutch is let in so that the vehicle may be propelled. According to my invention the transmission and wheel brakes need not be used to prevent backward movement of the vehicle and at the same time it leaves the drive shaft free to be rotated by the engine in a direction to propel the vehicle forward. This is due to the fact that the disc (3) which is keyed to the drive shaft is free to rotate in a forward direction, but just as soon as it starts to rotate in a reverse direction the locking devices (4) lock the same to the drum (1) and by braking the drum (1) by the brake band (2) the drum (1) may be held against rotation, which will consequently lock the drive shaft against rotation in a reverse direction. Should it become necessary to permit rotation of the drive shaft "D" for backing up purposes, the brake band (2) may be relieved, in which event the disc (3) and the drum (1), while locked together, will be free to rotate as a unit in a reverse direction. Then just as soon as the driver of the vehicle actuates the brake band (2) to lock the drum (1), backing up movement will be arrested.

The plate 3ª always rotates with the drum but has limited rotary movement thereagainst for the purpose of exposing its openings to the pawls as shown in Figure 3, or of riding over them a short distance as shown in Figure 4. This may be accomplished by any desired arrangement but is here shown to be effected by the pawl 4 itself, Figure 3 shows it as constituting the limit in one direction and Figure 4 in the opposite direction, as it is depressed to its limit with its end tight against the edge of the pawl recess in the drum and with its outer side preventing further rotation of the plate.

My invention while especially adapted for use in connection with motor vehicles for realizing the above advantages, is in no way limited or confined to this use as it may find expression in means for controlling the reverse movement in any driving or driven elements where it would work to advantage.

I claim:

In a reverse movement control for driving or driven elements, a drum mounted with freedom for rotation on said element, a disc housed within said drum and fixed to rotate with said element, a plurality of dogging devices housed within pockets formed in the inside face of the drum, notches in the face of the disc confronting the dogging devices, a plate between the confronting faces of the disc and drum for controlling the interlocking engagement between the dogging devices and the notches in the disc, openings in the plate to permit the dogging devices to engage said notches, springs behind the dogging devices for urging them through said openings in the plate and into said notches in the disc, resilient means for forcing the plate against the disc, and a manually manipulated brake band around the outer braking surface of the drum.

CHARLES PAUL CIRAC.